Patented Oct. 24, 1950

2,526,654

UNITED STATES PATENT OFFICE 2,526,654

PROCESS FOR PREPARING MODIFIED STYRENE INTERPOLYMERS

Anthony H. Gleason, Per K. Frolich, and William J. Sparks, Westfield, N. J., assignors, by mesne assignments, to Jasco, Incorporated, a corporation of Delaware No Drawing. Application December 29, 1945, Serial No. 638,515

6 Claims. (Cl. 260—84.3)

This invention relates to new and useful high molecular weight interpolymerization products of unsaturated organic compounds. More particularly, it relates to the preparation of high molecular weight, hard, tough and thermoplastic resins of technically valuable properties by the interpolymerization of conjugated diolefin hydrocarbons containing from 4 to 6 carbon atoms per molecule with vinyl aromatic hydrocarbon compounds in emulsion with water, emulsifying agent, polymerization modifier, and catalyst while maintaining the emulsion at a temperature of about 25° C. to 75° C.

This application is a continuation-in-part of application Serial No. 408,814, filed August 29, 1941, and subsequently abandoned.

Polystyrene has outstandingly valuable electrical properties, but its use is limited because of its brittleness and general lack of plasticity. Attempts to overcome this defect by the use of a plasticizer have not been successful, because no plasticizing agent has been found which does not materially detract from the desirable electrical properties of pure polystyrene or does not adversely affect physical properties. Polyisobutylene of high molecular weight has repeatedly been suggested for this purpose, since it is one of the few known materials that possesses the same desirable electrical properties as polystyrene. This combination is not effective, however, since polystyrene is not compatible with polyisobutylene at room temperature, and for this particular reason, these mixtures have not been physically suitable for most uses in the field of electrical insulation.

In the preparation of insulating compositions for high frequency radio transmitting and receiving systems, (which systems require insulation showing very low dielectric losses) many insulative compositions have heretofore been proposed but none has been found which has the very low hysteresis losses necessary to permit its use at ultra high frequencies with a minimum of energy loss, and maximum transfer of energy through the insulated circuits; and a minimum of heat deterioration in the insulation itself. Very low dielectric losses are most essential in high frequency radio systems because the percentage energy loss of radio frequency energy with a given dielectric material increases as the frequency increases and at frequencies ranging from 1 megacycle up, especially at frequencies above 10 megacycles, the losses of energy from dielectric hysteresis in ordinary dielectrics is prohibitively high.

Heretofore, interopolymers of vinyl aromatic hydrocarbons such as styrene with diolefinic hydrocarbons have been prepared by the emulsion polymerization reaction in the form of plastic, rubber-like masses having soft, rubber-like properties. The proportion of a diolefinic hydrocarbon and styrene in the finished plastic, rubber-like polymerizate as heretofore prepared was less than 55% by weight of styrene. Furthermore, the concentration of styrene in mixtures utilized in the prior art emulsion polymerization reaction varied from about 20% up to about 70% by weight when copolymerized with a diolefinic hydrocarbon. The interpolymers obtained by the emulsion polymerization reaction with these proportions of styrene are plastic rubber-like masses having soft, rubber-like properties, and are hydrocarbon compatible. They do not, however, possess the properties of hardness, toughness and extrudability when blended with polybutenes or other hydrocarbon polymers which are necessary for the preparation of compositions for use as insulators for electrical conductors.

With the above requirements in mind, it has been discovered that when a vinyl aromatic hydrocarbon having the following structural formula:

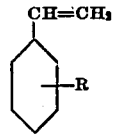

wherein R is selected from the group consisting of hydrogen, methyl, ethyl, propyl, methoxy, ethoxy, chlorine, bromine, fluorine and the cyano radical, is interpolymerized in the proportion of 65% or 75% as a minimum amount to as high as 95% by weight, with a conjugated diolefin hydrocarbon compound in the proportion of 35% to 5%, working in emulsion form at a temperature ranging from about 25 to 75° C. or higher until the mixture of monomers is at least 80–90% converted to polymers, wholly new interpolymers are obtained which differ materially in physical properties from interpolymers which contain between about 15 to 40% and even up to as high as 50–55% of such vinyl aromatic compounds. The interpolymers formed in accordance with the present invention are hard, tough, thermoplastic resinous materials which are highly desirable for admixing or blending with polyisobutylene or other hydrocarbon polymers to give compositions capable of being extruded for the preparation of structural articles of all kinds, such as extruded tubing suitable for being drawn and turned into shaped articles, wire insulation, solid rods, pressed or molded articles and for the preparation of coated fabrics of improved light resistance, ozone resistance and reduced tackiness. The resinous materials formed in accordance with the present invention are particularly valuable for electrical insulation for high frequency circuits because of their very low dielectric losses.

In carrying out the process of this invention a vinyl aromatic compound of the above formula such as styrene, para methyl-, ethyl- or propyl-styrene, mono- and polychlorinated styrenes, brominated or fluorinated styrene, methoxy- or ethoxy-styrenes or cyanostyrenes, or the like, is employed in admixture with a conjugated diene of the type of butadiene, isoprene, piperylene, dimethyl butadiene, chloroprene or other diolefin having 4 to 6 carbon atoms capable of polymerization of copolymerization with the vinyl aromatic compound in emulsion form. The preferred method is to disperse the reactants in the desired proportions in water containing an emulsifying agent such as sodium oleate or other water soluble soaps or the like and a polymerization catalyst such as potassium persulfate or perborate. The mixture is then polymerized in a pressure vessel for about 10 to 75 hours but preferably for 10 to 24 hours at 25° to 75° C. When the reaction is completed or the monomers are at least above 80% converted to polymers, the resulting latex-like dispersion is coagulated by treating the latex with a suitable coagulant such as isopropyl alcohol or brine. The coagulate, after washing several times with water and finally with alcohol to remove emulsifiers and soluble impurities, is dried by any conventional method. It then can be blended with polybutene or other hydrocarbon polymers.

By utilizing the monomers in the ratios disclosed above and by carrying the conversions to such high levels, i. e. 80% or more, it is possible to produce products having the necessary physical characteristics, i. e. high molecular weight and high Williams Plasticity-Recovery values.

The effect of high conversions upon the molecular weight of the copolymer may be readily seen from the following data summarizing the results obtained by polymerizing styrene and butadiene in a weight ratio of 75 to 25 in aqueous emulsion in accordance with this invention. Samples were withdrawn from the reaction mixture periodically, the conversion determined whereupon the intrinsic viscosity of the product was determined from which the approximate molecular weight average values were calculated. The results were as follows:

| Percent Conversion | Molecular Weight |
|---|---|
| 5 | 200,000 |
| 16 | 284,000 |
| 59 | 284,000 |
| 79 | 429,000 |
| 84 | 518,000 |
| 98 | 900,000 |

It will readily be seen from these data that the apparent molecular weight of the copolymer rises appreciably between 60 and 80% conversion and continues to do so at a more or less accelerated rate at conversions between 80 and 98%. For general usage for applicants' purposes, the copolymers should have an apparent molecular weight of at least 375,000 to 400,000 and preferably in the molecular weight range of 500,000 to 900,000 inasmuch as the Williams plasticities of the products in this range are well in excess of 200 at 70° C. (5 kg. wt.).

In the event that conversions below about 85% are employed it is necessary to increase the proportion of styrene or vinyl aromatic compound in the feed in order to get the desired hardness and molecular weight in the product.

At conversion levels of 80–100%, the polymers which have been crumb washed and crumb dried are very often insoluble due to the presence of substantial quantities of gel. This naturally would be disadvantageous if it were desired to use the polymer in solution. However, the preferred method of washing and drying the copolymer produced in accordance with this invention is by the use of a hot mill (170–180° F.), this treatment having been found to convert any gel present so that a completely soluble polymer is obtained. In lieu of mill washing and drying other means of hot mastication such as banburying, extrusion and the like may be used. Accordingly, it appears that the most desirable products are obtained by a combination of high styrene to diene ratios, high conversion with consequent high molecular weight and hot mastication of the copolymer product.

Agents which may be used for emulsifying the monomers in accordance with the present invention include such substances as alkali metal soaps of higher fatty acids such as sodium oleate, sodium salts of selectively hydrogenated tallow acids, salts of sulfated amides, salts of sulfated alcohols, salts of alkyl naphthalene sulfonic acids such as isopropyl naphthalene sulfonic acid, acid type emulsifiers such as the cation active compounds of high molecular weight amine salts as dodecylamine hydrochloride, Turkey red-oil, and Emulphor type condensation products of high molecular weight alcohols and ethylene oxide. The amount of emulsifier is ordinarily about 0.5 to about 5 wt. per cent based on the reactants. For the interpolymerization there is used from about 0.05 to about 0.6 weight per cent based on the reactants of a polymerization catalyst capable of yielding oxygen under the reaction conditions such as hydrogen peroxide and benzoyl peroxide, and inorganic per salts such as sodium perborate, sodium persulfate and sodium per carbonate.

The emulsion polymerization reaction may be conducted in the presence of catalyst promoters, and modifiers of the type of organic sulfur compounds such as thio-acids, high molecular weight mercaptans such as benzyl, or the aliphatic mercaptans having at least 6 carbon atoms per molecule such as octyl, dodecyl, tetradecyl mercaptans and mixtures of mercaptans such as are obtainable for example from commercial lauryl alcohol, nitro hydrazines and amino compounds. These agents which are used in small amounts, generally 0.05 to 0.25 or 1 or even 2 wt. per cent based on the reactants exert a promoting and/or modifying effect on the reaction and the resulting interpolymers. These materials are referred to generally hereinafter as polymerization modifiers and are not to be confused with the polymerization catalysts or oxygen yielding substances described above. The following example is included in order to illustrate the invention more fully.

EXAMPLE

Several runs were carried out in a 3-gallon turbomixer type of reactor according to the following recipe:

| | |
|---|---|
| Styrene | 75 parts |
| Isoprene | 25 parts |
| Lorol Mercaptan[1] | 0.05 part at start |
| Lorol Mercaptan[1] | 0.05 part at 75% Conv. |
| Water | 300 parts |
| Sodium soap of selectively hydrogenated tallow acids (complete neutralization) | 7 parts |
| Potassium persulfate | 0.45 part |
| Temperature | 50° C. at start |
| Raised after 50% conversion to | 55° C. |
| Raised after 75% conversion to | 60° C. |
| Conversion | 93±2% |
| Time | 14–16 hours |

[1] Lorol mercaptan is predominantly $C_{12}$ mercaptan obtained from commercial lauryl alcohol.

In spite of the 3/1 water monomer ratio the high conversion still yields latices of about 25% solids content. The latices formed were short-stopped at the end of the reaction with hydroxylamine or hydroquinone, and stabilized with 0.5–1.0% of a suitable anti-oxidant such as phenyl beta naphthylamine.

The latex was coagulated by adding the same to about an equal volume of saturated sodium chloride brine, below 50° C., whereupon the mixture was brought to 50° C. and 0.2 N acetic acid added to get the desired particle size and then quenched with 0.2 N NaOH. The slurry was then diluted with an equal volume of cool water and filtered, cake reslurried twice with water at 40° C. and then in alkali followed by final water washing and drying. Alternatively, the polymer may be mill washed and dried on the hot (170–180° F.) mill.

The results obtained are summarized in the table.

for blending with many substances including oils, waxes, and predominantly hydrocarbon rubber-like polymeric bodies, such as natural rubber, Buna S (butadiene-styrene emulsion interpolymer), polyethylene, etc. Substances having a further plasticizing action on either of the component polymers may likewise be added at will and the usual organic and inorganic fillers or mixtures thereof may be incorporated therein.

The interpolymers are useful in combination with practically any of the natural and synthetic resins and gums with some of which they form true solutions and with others they form a disperse phase within a continuous phase. They are particularly useful with such materials as the polyindene-coumarone resins, the polyvinyl chlorides, polyvinyl acetylene, polycoumarones, polyvinyl acetate, polyacrylates and methacrylates, cellulose esters and ethers, chlorinated rubber, phenol aldehyde resins, the natural and synthetic waxes, rosin and natural resins, polyamides, factice, alkyd resins, phenol formaldehyde condensation resins such as Bakelite, resins obtained from petroleum residues, hydro rubber, mineral waxes, petroleum waxes and vegetable waxes.

The interpolymers alone or in combination with polyisobutylene, polythene, gutta perchas, ballata, natural or synthetic rubber can be readily compounded with a wide range of filler materials to give new and technically useful compositions. The following list shows representative suitable compounding substances:

Chlorinated paraffin wax
Chlorinated olefin polymers
Alkyd resins
Oxidized polymeric materials
Chlorinated resins
Carbon black, active reinforcing or inactive
Clays
Tricresyl phosphate
Asbestos
Dibutyl phthalate
Wood flour
Cetyl methacrylate polymer

Table

| Run No. | Percent Modifier Lauryl Mercaptan | Initial Temp. °C. | Final Temp., °C. | Time of Run, Hours | Percent Conv. | Washing and Drying | Williams Plast.-Rec. 70° C./5 Kg. | Other Data |
|---|---|---|---|---|---|---|---|---|
| 1 | 0.05 | 60 | 60 | 13 | 95+ | On mill | 207–59 | M. W. 540,000. |
| 2 | [1] 0.25 | 60 | 60 | 17 | 99+ | ...do | 70–0 | M. W. 436,000. |
| 3 | 0.05 | 55° to 64% conv.<br>60° to 87% conv. | 70 | 16 | 98+ | ...do | 293–76 | M. W. 900,000. |
| 4 | 0.1 | 50° to 50% conv.<br>55° to 80% conv. | 60 | 16.5 | 93 | | | 7% soap on monomers, M. W. 517,000 @ 84% conv. |

[1] 0.25 mercaptan added: 0.2% initially and 0.05 at 70% conversion.
Note.—In most cases reactor was cleaned prior to each run. However, runs #1 and 2 were made without intermittent cleaning.

As is apparent from the above examples, this invention is not limited to the use of any particular emulsifying agent, catalyst, or modfier in the polymerization reaction, since types other than that disclosed in the examples may be effectively used.

The olefin-vinyl benzene interpolymers prepared in accordance with the present invention are conveniently applicable to many uses, both for blending with polyisobutylene and other olefinic polymers; and also for use alone for many services such as for protective coatings on metals, wood, fabrics, etc., or for the preparation of self-supporting films. They are particularly useful Abalyn (ethyl abietate)
Polyesters
Polycylopentadiene resins
Polymerized terpenes
Polymerized ethylene (polythene)
Polyvinyl acetal resin
Asphalt
Pitch
Polyhydronaphthalenes
Drying oil resins
Mineral rubbers
Hydrogenated terpene polymers Thus the invention presents a new process for the polymerization of vinyl aromatic compounds such as styrene with diolefinic materials to yield new and particularly valuable interpolymers, characterized by substantial solidity, toughness, flexibility, thermoplasticity and the capability of compounding with a wide range of filler substances and other resinous or rubbery substances, to yield a series of particularly valuable compositions of matter, particularly suited for the preparation of molded articles in general and electric insulation in particular.

While there are above described a limited number of embodiments of the invention, it is possible to produce still other embodiments without departing from the inventive concept herein disclosed and it is therefore desired that only such limitations be imposed on the appended claims as are stated therein or required by the prior art.

What we claim and desire to secure by Letters Patent is:

1. In a process for preparing a tough, hard, thermoplastic resin, the improvement which consists of emulsifying in water a mixture consisting of 75 to 95 wt. per cent of a vinyl aromatic compound corresponding to the formula

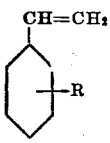

wherein R is selected from the group consisting of hydrogen, methyl, ethyl, propyl, methoxy, ethoxy, chlorine, bromine, fluorine, and cyano; 25 to 5 wt. per cent of a conjugated diene having 4 to 6 carbon atoms per molecule; an emulsifying agent; an oxygen yielding catalyst; and 0.05 to 2 wt. per cent based on the weight of the monomer of an aliphatic mercaptan having from 6 to 14 carbon atoms per molecule; and heating the emulsified mixture at a temperature between 25° and 75° C. until at least 80% monomer conversion is reached.

2. In a process for preparing a tough, hard, thermoplastic resin, the improvement which consists of emulsifying in water a mixture consisting of 75 to 95 wt. per cent of styrene, 25 to 5 wt. per cent of a conjugated diolefin having 4 to 6 carbon atoms per molecule, 0.5 to 5 wt. per cent of an emulsifying agent based on monomers, 0.05 to 0.6 wt. per cent of an oxygen yielding catalyst based on monomers, and 0.05 to 1 wt. per cent based on monomers of an aliphatic mercaptan having 6 to 14 carbon atoms per molecule; and heating the emulsified mixture for 10 to 24 hours at a temperature between 25° and 75° C., until at least 80% monomer conversion is reached.

3. A process according to claim 2 wherein the diolefin is butadiene.

4. A process according to claim 2 wherein the diolefin is 2,3-dimethyl butadiene-1,3.

5. In a process for preparing a tough, hard, thermoplastic resin, the improvement which consists of emulsifying in water a mixture consisting of 75 to 95 wt. per cent of styrene, 25 to 5 wt. per cent of isoprene, 0.5 to 5 wt. per cent of a water soluble soap based on monomers, 0.05 to 0.6 wt. per cent of an oxygen yielding catalyst based on monomers, and 0.05 to 0.25 wt. per cent based on monomers of an aliphatic mercaptan having 6 to 14 carbon atoms per molecule; and heating the emulsified mixture for 10 to 24 hours at a temperature between 25° and 75° C. until at least 80% monomer conversion is reached, whereby a resin having a molecular weight of at least 400,000 is produced.

6. In a process for preparing a tough, hard, thermoplastic resin, the improvement which consists of emulsifying in water a mixture consisting of 75 wt. per cent of styrene, 25 wt. per cent of isoprene, 0.5 to 5 wt. per cent of sodium oleate based on monomers, 0.05 to 0.6 wt. per cent of potassium persulfate based on monomers, and 0.05 to 0.25 wt. per cent based on monomers of an aliphatic mercaptan having predominantly 12 carbon atoms per molecule; and heating the emulsified mixture for 10 to 24 hours at a temperature between 25° and 75° C. until at least 90% monomer conversion is reached.

ANTHONY H. GLEASON,
PER K. FROLICH
WILLIAM J. SPARKS

REFERENCES CITED

The following references are of record in the file of this patent:

UNITED STATES PATENTS

| Number | Name | Date |
|---|---|---|
| 2,217,631 | Wolfe | Oct. 8, 1940 |
| 2,335,124 | Konrad et al. | Nov. 23, 1943 |
| 2,393,157 | Gleason et al. | Jan. 15, 1946 |

FOREIGN PATENTS

| Number | Country | Date |
|---|---|---|
| 456,442 | Great Britain | Aug. 8, 1935 |